Patented June 15, 1926.

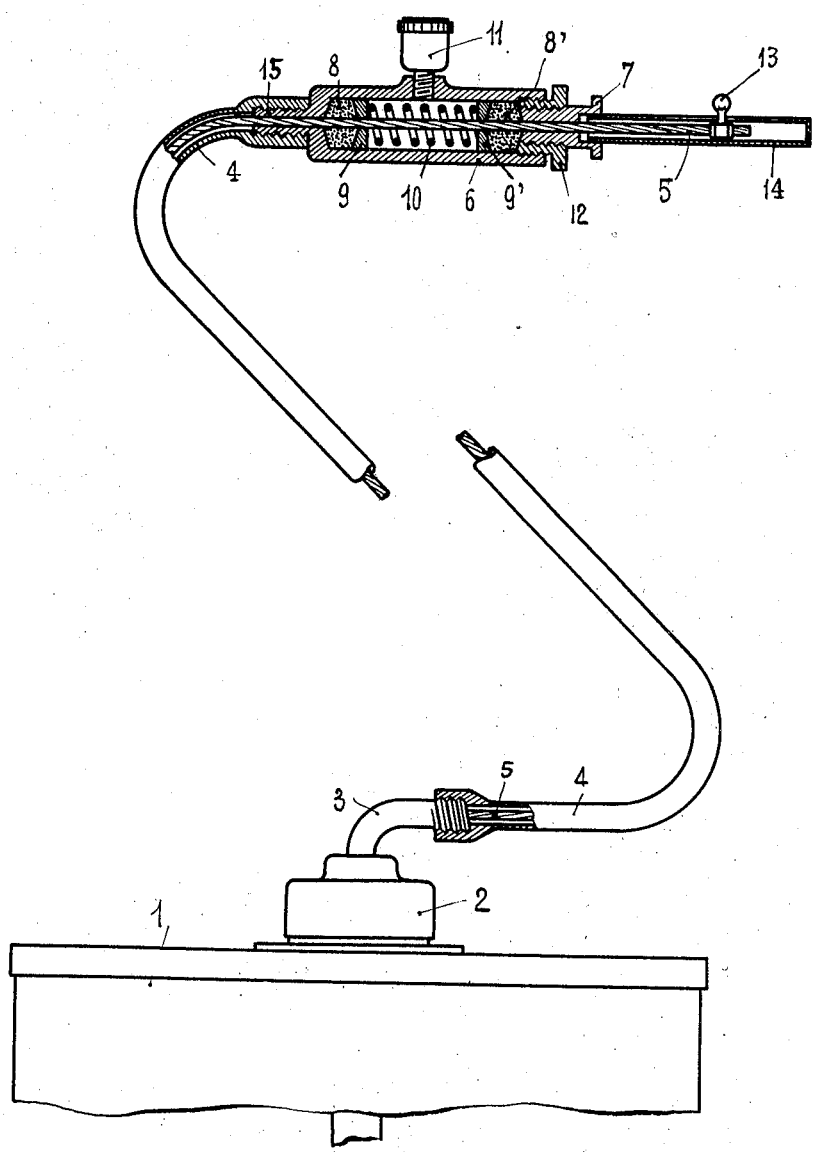

1,589,108

UNITED STATES PATENT OFFICE.

ETTORE CARETTA, OF TURIN, ITALY.

FLEXIBLE TRANSMISSION.

Application filed November 13, 1925, Serial No. 68,869, and in Germany November 18, 1924.

The present invention relates to a transmission member by which the movement of an operating member is transmitted to a member mounted to move in a receptacle, and has for its object a transmission member of said class adapted to be used in connection with receptacles in which a pressure is operative, and providing packing means for preventing the escape of said pressure through the transmission member.

According to the present invention the packing member is mounted adjacent said operating member and independent of the receptacle; the present invention also comprises a construction of said packing member which provides for an efficient sealing at its ends.

In the figure of the annexed drawing is shown by way of example an embodiment of the present invention.

In said figure, 1 is a receptacle where is mounted a member, not shown, intended to be actuated by the transmission, and 2 is a plug on which is mounted a fitting 3 connected with a tube 4 consisting of a metal wire sheath having a rubber cover in order to make it impervious to fluids. At the opposed end of the tube 4 is arranged the packing member through which the inner cord or cable 5 of the flexible transmission issues to outside.

The said packing member comprises a cylindrical sleeve 6 having at one end a tubular screwthreaded extension 15 for connection with the tube 4 and a perforated plug 12 screwed in its opposed end, and a smaller plug 7 passed by the cable 5 is screwed in said tubular plug 12.

On the bottom of the sleeve 6 and against plugs 7 and 12 are arranged packings 8, 8' held in position by washers 9—9' against which bear the ends of a spring 10 arranged in the intermediate portion of the sleeve 6.

On the sleeve 6 is also provided a lubricating cup 11 which provides for introducing a lubricating or greasy material in the sleeve space in which the spring 10 is located.

The spring 10 produces the requisite pressure on the packings 8—9 and 8'—9' and the cord 5 when moved in either direction carries an amount of greasy material in either of said packings, this material improving the sealing of the packings.

The cord or cable 5 is operated by means of a stud 13 intended to move in a stationary guide member 14.

In view of the arrangement of the packing member adjacent to the cable actuating member, it is possible to easily overcome the resistance produced by the packing member against movement of the cable 5, this cable being entirely free within its sheath in its portion between the packing member 6 and receptacle 1 and therefore being not subject to high frictional resistance. This feature is of large importance in the case the cable 5 is actuated by thrust (as distinguished from a pull) because in such a case the portion of the same which is subject to packing friction is very close to the point of action of thrust and the portion of cable 5 between said point of action of thrust and packing is sufficiently rigid, in view of it being short, to prevent it from waving while the long portion of cable between packing and receptacle is not under a heavy thrust (the resistance of the member controlled by said cable being very small with respect to packing friction resistance); therefore the cable 5 is not caused to wave within its sheath along its full extent, which fact would give rise to a large number of contact points between cable and sheath and to a very strong resistance by friction which would prevent the manipulation by hand of the apparatus.

The described apparatus is adapted to use in apparatus for inspection from a distance of the amount of liquid contained in a receptacle under pressure, but of course the present invention is only confined by appended claims.

What I claim as my invention and desire to secure by U. S. Letters Patent is:—

1. A flexible transmission comprising an outer fluid-impervious sheath adapted to be connected with a receptacle under pressure at one end, a packing member at the other end of said sheath, an inner transmission member passing through said sheath and packing member and a member beyond said packing member and adjacent thereto for actuating said inner transmission member.

2. A flexible transmission comprising an outer fluid-impervious sheath adapted to be connected with a receptacle under pressure at one end, a packing member at the other end of said sheath, an inner transmission member passing through said sheath and packing member and a member beyond said packing member and adjacent thereto for actuating said inner transmission member, said packing member comprising a sleeve and a packing gland at each end of said sleeve and said packing glands leaving an intermediate space for reception of greasy material.

3. A flexible transmission comprising an outer fluid-impervious sheath adapted to be connected with a receptacle under pressure at one end, a packing member at the other end of said sheath, an inner transmission member passing through said sheath and packing member and a member beyond said packing member and adjacent thereto for actuating said inner transmission member, said packing member comprising a sleeve and a packing gland at each end of said sleeve, said packing gland leaving an intermediate space for reception of greasy material, and a spring located in said intermediate space and having its ends bearing on said packing glands.

In testimony whereof I have signed my name to this specification.

ETTORE CARETTA.